United States Patent
Sanchis Brines et al.

(10) Patent No.: US 10,850,424 B2
(45) Date of Patent: Dec. 1, 2020

(54) ARTIFICIAL STONE SLAB COMPRISING VEINS AND METHOD OF MANUFACTURING SAME

(71) Applicant: COMPACSTONE USA, INC, Miami, FL (US)

(72) Inventors: Francisco Sanchis Brines, Tavernes de la Valldigna (ES); Alberto Ortolà Mascarell, Rotova (ES); Angel Gelpi Ferreira, Naron (ES)

( * ) Notice: Subject to any disclaimer, the term of this patent is extended or adjusted under 35 U.S.C. 154(b) by 146 days.

(21) Appl. No.: 15/575,844

(22) PCT Filed: May 23, 2016

(86) PCT No.: PCT/IB2016/000692
§ 371 (c)(1),
(2) Date: Nov. 21, 2017

(87) PCT Pub. No.: WO2016/189377
PCT Pub. Date: Dec. 1, 2016

(65) Prior Publication Data
US 2018/0126673 A1    May 10, 2018

(30) Foreign Application Priority Data
May 22, 2015   (EP) ..................................... 15380018

(51) Int. Cl.
*B28B 1/00*  (2006.01)
*B44F 9/04*  (2006.01)
(Continued)

(52) U.S. Cl.
CPC ............ *B28B 1/005* (2013.01); *B28B 13/021* (2013.01); *B28B 13/022* (2013.01);
(Continued)

(58) Field of Classification Search
CPC ... B29C 67/242; B29C 67/243; B29C 67/244; B29D 99/0039; B28B 1/005;
(Continued)

(56) References Cited

U.S. PATENT DOCUMENTS

| | | | | |
|---|---|---|---|---|
| 2,069,108 A | * | 1/1937 | Kuhlman | B25B 15/007 81/440 |
| 2,591,125 A | * | 4/1952 | Orville | A45D 24/28 132/116 |

(Continued)

FOREIGN PATENT DOCUMENTS

| | | |
|---|---|---|
| CA | 2896383 | 7/2014 |
| CH | 190667 | 5/1937 |

(Continued)

OTHER PUBLICATIONS

Ferrazzini, Emilio, English translation of CH190667, May 15, 1937 (Year: 1937).*

(Continued)

*Primary Examiner* — Anthony Calandra
*Assistant Examiner* — Eric T Chen
(74) *Attorney, Agent, or Firm* — Eugenio J. Torres-Oyola; Victor M. Rodriguez-Reyes; Rafael Rodriguez-Muriel

(57) ABSTRACT

A method of manufacturing an artificial stone slab with veins comprises preparing a moldable hardenable fluid mixture of a first material (11); pouring the mixture into a mold (20) an upper face being exposed; engraving the exposed upper face with a predefined precise pattern of grooves (30) coinciding with a pattern of thin veins to be obtained; impregnating at least the inner faces (31) of the grooves (30) with a moldable hardenable fluid mixture of a second material (12), the color of both materials being different; causing the collapse and closure of the grooves, a visible pattern of thin veins of a second material with a natural look (Continued)

being left behind; curing the artificial stone slab by subjecting it to vibration, compression and vacuum until the fluid mixtures of the first material and of the second material are hardened.

20 Claims, 2 Drawing Sheets

(51) Int. Cl.
| | |
|---|---|
| *B28B 13/02* | (2006.01) |
| *B44C 3/10* | (2006.01) |
| *C04B 26/18* | (2006.01) |
| *B44C 5/04* | (2006.01) |
| *B29C 67/24* | (2006.01) |
| *B29K 105/16* | (2006.01) |
| *B29L 31/10* | (2006.01) |

(52) U.S. Cl.
CPC ...... *B28B 13/0225* (2013.01); *B28B 13/0295* (2013.01); *B29C 67/244* (2013.01); *B44C 3/10* (2013.01); *B44C 5/0453* (2013.01); *B44F 9/04* (2013.01); *C04B 26/18* (2013.01); *B29K 2105/16* (2013.01); *B29L 2031/104* (2013.01)

(58) Field of Classification Search
CPC ....... B28B 1/082; B28B 3/022; B28B 13/022; B28B 13/0225
See application file for complete search history.

(56) References Cited

U.S. PATENT DOCUMENTS

| | | | | |
|---|---|---|---|---|
| 2,947,084 | A * | 8/1960 | Billings | ................ E04F 21/165 |
| | | | | 33/32.2 |
| 4,204,820 | A * | 5/1980 | Toncelli | ............. B29C 37/0067 |
| | | | | 425/89 |
| 4,698,010 | A | 10/1987 | Toncelli | |
| 5,795,513 | A * | 8/1998 | Austin | .................... B28B 1/005 |
| | | | | 264/71 |
| 5,976,642 | A * | 11/1999 | Yang | ....................... B28B 1/005 |
| | | | | 428/15 |
| 7,968,165 | B2 * | 6/2011 | Barnes | ............... A47G 27/0275 |
| | | | | 428/48 |
| 2010/0055357 | A1 * | 3/2010 | Ciccarello | ............... B28B 3/022 |
| | | | | 428/15 |

FOREIGN PATENT DOCUMENTS

| | | |
|---|---|---|
| EP | 0970790 | 1/2000 |
| EP | 1767320 | 3/2007 |
| FR | 353105 | 9/1905 |
| FR | 2117007 | 7/1972 |
| WO | 2005090034 | 9/2005 |
| WO | 2014108582 | 7/2014 |

OTHER PUBLICATIONS

Swenden, James, English translation of FR2117007, Jul. 21, 1972 (Year: 1972).*
International Search Report and written opinion of PCT application No. PCT/IB2016/000692 dated Sep. 15, 2016.
European search report and written opinion of European priority application No. 15380018.0 dated Nov. 20, 2015.

* cited by examiner

ARTIFICIAL STONE SLAB COMPRISING VEINS AND METHOD OF MANUFACTURING SAME

RELATED APPLICATIONS

This application is the US national phase application of international application number PCT/IB2016/000692, filed 23 May 2016, which designates the US and claims priority to European application EP 15380018.0 filed 22 May 2015, the contents of each of which are hereby incorporated by reference as if set forth in their entireties.

FIELD OF THE ART

The present invention relates to the field of manufacturing artificial stone slabs comprising veins, for example imitating marble slabs, by means of combining at least two moldable hardenable fluid mixtures of a first material and a second material having different colors, said two materials being combined following a predefined precise pattern coinciding with a pattern of thin veins to be obtained.

STATE OF THE ART

Manufacturing artificial stone slabs with a cluster of granular stone particles is known by means of patent documents U.S. Pat. No. 4,698,010A and EP0970790B1, for example, which describe a method of manufacturing that uses polymerizable resins mixed with said granular particles for solidifying said cluster after curing with vibration, pressure and vacuum, which allows eliminating any trace of air from the inside of the mixture.

A product similar to that described up until now is also known by means of patent document WO2014108582, but it is formed by two different colored mixtures of said cluster that are combined forming strata, making said product looks like it has thick veins, but said document does not describe in detail the method whereby both mixtures are combined producing said strata, although they seem to be obtained by means of stacking both mixtures in alternate layers. Said system does not allow defining the precise path or geometry of said veins, nor does it allow controlling the intersection points of said thick veins with the edges of the slab.

The technique of manufacturing the so-called cement tiles (or hydraulic pavement) consisting of placing, in a mold, inserts defining compartments separated by thin walls is also known. A different colored fluid mixture, conventionally formed by a mixture of cement, water and colorant, is poured into each compartment, after which the insert is removed, the mold is filled with cement and the mold is compressed, obtaining a rigid slab with a visible face showing a predefined precise pattern of different colored areas.

Document FR353105 describe a method of manufacturing a plaster slab containing veins, wherein said veins are created moving, by hand, a pipe through the molded plaster before its hardening, creating a groove on it and filling said groove with a hardenable fluid supplied through said pipe.

FR 2117007 discloses a process for the production of slabs with veins, or tiles with drawing, comprising filling a mold with a layer of colored or colorless paste, for example a chipboard cement; printing in this layer imprints by means of appendages attached to a common support having the configuration of the desired pattern; said imprints including one or more colored materials and vibrating the mass and completing the filling of the mold by a second layer of paste, for example concrete, and compressing the mass thus formed.

BRIEF DESCRIPTION OF THE INVENTION

The present invention relates to a method of manufacturing an artificial stone slab comprising veins, said method comprising the following steps performed in the following order:

a) preparing a moldable hardenable fluid mixture of a first material including stone particles having a different grain size distribution;

b) pouring a controlled amount of said mixture of the first material into a mold of the size of the artificial stone slab to be manufactured, an upper face of the mixture deposited in the mold being exposed;

The amount of fluid mixture that is poured will be controlled so that it is enough to fill the entire mold with a regular thickness of fluid mixture similar to the desired thickness of the stone slab to be manufactured.

The method subsequently includes the following steps:

c) engraving the exposed upper face of the fluid mixture with a predefined precise pattern of open grooves, coinciding with a pattern of thin veins to be obtained;

d) impregnating at least the inner faces of said grooves with a moldable hardenable fluid mixture of a second material, the color of the first material and of the second material being different;

e) causing the collapse and closure of the grooves, obtaining a visible pattern of thin veins of a second material with a natural look;

f) curing the artificial stone slab by subjecting it to vibration, compression and vacuum until the fluid mixtures of the first material and of the second material are hardened; and g) releasing the artificial stone slab from the mold.

In other words, grooves similar to furrows which will preferably have tapering V-shaped section that will be kept open temporarily in the fluid mixture as a result of the viscosity and cohesion of said fluid mixture of the first material are made on the exposed upper face of the fluid mixture of the first material.

Said engraved grooves will have inner faces on which a hardenable fluid mixture of a second material having color and grain size distribution different from that of the first material will be impregnated for subsequently causing the collapse and closure of said grooves and then curing the slab and releasing it from the mold.

The grooves can be engraved, by way of preferred example, by means of pressing an array of protrusions on the exposed upper face, said array of protrusions being complementary with the pattern of thin grooves to be engraved. Inserting the array of protrusions in the exposed face of the fluid mixture and the subsequent removal thereof leaves said exposed face with said grooves. Said array of protrusions can be placed on a flat plate, for example, or arranged on a roller which gradually insert said pattern on the fluid mixture by means of rolling over said exposed face.

There are many other ways for obtaining said grooves, for example, by means of inserting a punch or a horizontal rotating engraving disc roll in said fluid mixture, and subsequently moving same reproducing the pattern of thin veins to be obtained, either by means of following a pattern defined by means of a cam guide, or by means of an automated arm programmed for reproducing said pattern.

Impregnation can also be performed in many ways, for example, by means of projecting said fluid mixture of a second material through at least one projecting head. In such case, said second material will not contain ground particles, or said ground particles will be micronized, the grain size distribution thereof being comprised between 0.1 μm and 0.75 mm, to allow projection thereof preventing the projecting head from being blocked.

To prevent the fluid mixture of the second material from covering not only the inner faces of the grooves but also the exposed upper face, said projecting head can be located at the end of a robotic arm programmed for reproducing the pattern of thin veins such that the projection will only occur within said grooves. According to another embodiment, the array of protrusions, the punch or the mentioned engraving disc roll are impregnated with or give out said fluid mixture of the second material during the engraving step, such that the engraving and impregnation of the inner walls of the grooves is achieved simultaneously. Another possible embodiment is to cover the exposed upper face with a plate that only has openings coinciding with the pattern of thin veins, such that projection of the fluid mixture of the second material only goes through said plate and reaches said first material through said openings, therefore impregnating only said inner faces of the grooves.

Impregnation of the inner faces could also optionally include filling said grooves with said second material.

Once the inner face of the grooves has been impregnated, the mentioned collapse and closure of the grooves is caused, thereby achieving that the exposed upper face becomes smooth again, but with a visible pattern of thin veins formed by said first and second materials.

Said collapse and closure of the grooves can be caused, for example, by means of one or more of the following techniques:
  leveling the exposed upper face by means of a roller;
  leveling the exposed upper face by means of a spatula;
  leveling by means of vibration-compression; and/or
  pressing on the fluid mixture.

Any of these techniques or a combination thereof, either smoothing out the exposed upper face by means of passing a roller or a spatula, or vibration-compression or pressing on the fluid mixture, will cause the grooves to close, such that the opposing inner faces of the groove will come into contact, retaining the fluid mixture of the projected second material, such that a line will become visible, which is more or less thick depending on the amount of second material impregnated in the mentioned groove.

The proposed method also additionally includes the following steps provided for further obtaining a pattern of thick veins with a natural look on the artificial stone slab to be manufactured in the following order:
  producing step b) into a mold provided with inserts, leaving portions of said mold free of the fluid mixture of the first material, said inserts having the precise shape of a predefined pattern of thick veins to be obtained;
  removing said inserts, leaving empty spaces;
  filling the mentioned empty spaces corresponding to said portions of the mold free of the fluid mixture of the first material with a moldable hardenable fluid mixture of a third material having a different color from that of the first material, before proceeding with steps f) and g).

Said inserts will preferably be elements or pairs of individual walls with a height equal to or greater than the thickness of the slab, and they will be supported at the bottom of the mold. In addition, said empty spaces preferably have a depth which embraces the total thickness of the artificial stone slab.

According to a first embodiment the inserts are removed, leaving portions of the mold free of the fluid mixture of the first material due to the viscosity and cohesion effect thereof which prevent it from collapsing filling the gap left by the inserts. Subsequently said gaps are filled with the fluid mixture of the third material. The mentioned filling of the portions of the mold free of the fluid mixture of the first material is performed by means of pouring said fluid mixture of a third material through openings made on a coating plate located on said exposed upper face covering it, said openings coinciding in shape, size and vertical position with said portions of the mold free of the fluid mixture of the first material.

In another embodiment, the inserts are formed by pairs of walls, and the space between said walls is filled with said fluid mixture of the third material before removing said pairs of walls.

The inserts in another embodiment are protected with an anti-adherent coating.

According to an embodiment, the automated arm further includes connected to the projecting head several interchangeable tools including at least a wheel, an awl, a plow and a comb in order to provide additional marks or recesses on any point of the exposed upper face of the mixture deposited in the mold. The tools also being prepared for reaching by the movement of said automated arm the area of the grooves to remove or extend in some degree the projected fluid mixture delivered on step d). Moreover, the automated arm may further include a dispensing device for distributing small stones or crystals at specified regions of the upper face of the mixture deposited in the mold.

A device for cleaning the interchangeable tools may be also used, based on the projection or immersion in a cleaning fluid.

Said fluid mixture of a first and/or a second and/or a third material will preferably be envisaged to look like natural stone when it hardens, said mixture being able to include real natural stone granules that give the hardened material real appearance and glow.

The second material preferably must be able to be projected, so the granules will preferably be micronized, being of a size that is small enough to allow the fluid mixture to be projected.

According to an embodiment, the grooves have a depth which is comprised between $3/10$ to $4/10$ of the total thickness of the artificial stone slab.

The grooves once engraved and before step d) provide, according to an embodiment, an open cavity with triangular cross section and two inclined opposed faces, and during said step d) at least one of this faces receives the projected fluid mixture of a second material, or alternatively both faces of the groove are covered with the same or different fluid mixture.

According to one embodiment, the moldable hardenable fluid mixture of a first, second and/or third material contains a polymerizable resin, ground solid particles having a different grain size distribution, and additives.

By way of example, it is contemplated that the materials forming the fluid mixture are selected from the following: resin selected from unsaturated polyester resin, methacrylate resin, epoxy resin, vinyl resin; ground solid particles having a different grain size distribution selected from marble, dolomite, opaque quartz, crystalline quartz, graphite, ferrosilicon, basalt, feldspar, granite, cristobalite, glass, silica, metals, plastics; additives selected from colorants, binders, accelerants, catalysts.

Likewise, it is also proposed that the slab is rectangular provided with four sides, in which:

the thin veins intersect said sides at first intersection points, and said first intersection points of two opposing sides of the same slab are symmetrical; and/or the thick veins intersect said sides at second intersection points, and said second intersection points of two opposing sides of the same slab are symmetrical; and/or the first intersection points of one and the same side are symmetrical along said same side; and/or the second intersection points of one and the same side are symmetrical along said same side.

This feature allows two parts with identical intersection points to be able to be placed adjacent to one another and the thin and/or thick veins thereof to have continuity from one slab to the next regardless of its orientation, making them look like portions cut from one and the same larger natural stone block.

If the length of the slab is furthermore a multiple dimension of the width of said slab, it facilitates being able to orient and combine a plurality of slabs with said identical intersection points in any way, maintaining said continuity between the thin and/or thick veins of a slab with respect to the contiguous slabs at all times.

The proposed method allows the pattern of thin veins and/or the pattern of thick veins to be branched, being able to faithfully reproduce the look of natural stones with veins, which show branched patterns at times, or even being able to reproduce geometric shapes or figures of any kind.

Optionally, it is proposed that after curing and hardening the slab the exposed upper face of the manufactured slab is polished, which allows assuring a perfectly flat and smooth finish, as well as eliminating any irregularity in the embossment that could have remained due to the application of the method.

The present invention also protects the slab produced by means of said method and by means of any of the optional embodiments described.

It will be understood that references to geometrical positions, such as for example, parallel, perpendicular, tangent, etc., allow deviations of up to ±5° with respect to the theoretical position defined by said nomenclature.

Other features of the invention will be described in the following detailed description of an embodiment.

BRIEF DESCRIPTION OF THE DRAWINGS

The foregoing and other advantages and features will be better understood based on the following detailed description of an embodiment in reference to the attached drawings which, must be considered in an illustrative and non-limiting manner, in which.

DETAILED DESCRIPTION OF ONE EMBODIMENT

Figure 1:
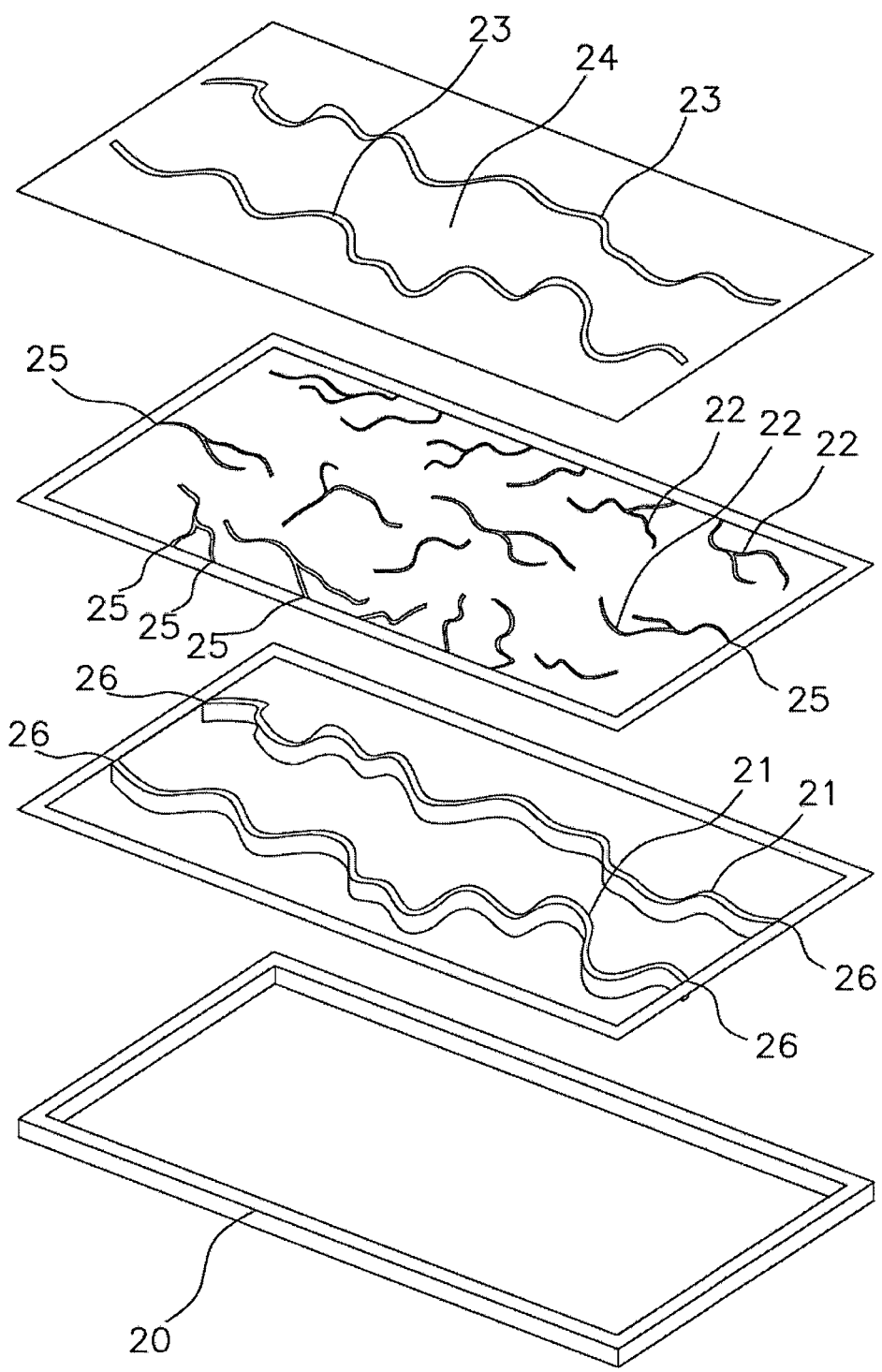
FIG. 1 shows an exploded perspective view of the different elements forming the tools necessary for the application of the proposed method, according to one embodiment in which slabs provided with thick and thin veins are manufactured.
Figure 2:
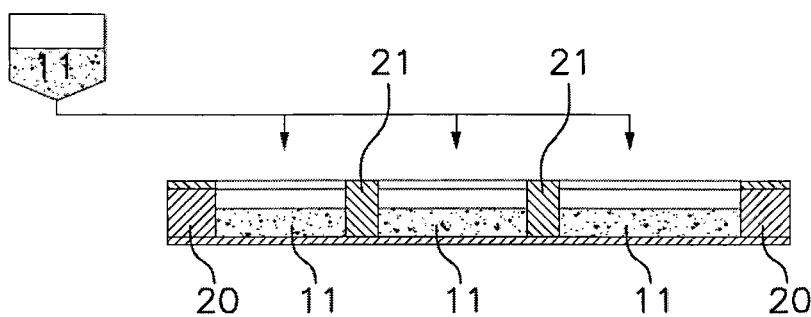
FIG. 2 shows a cross-section of the mold in a first step of the method of manufacturing a slab provided with thin and thick veins, in which the fluid mixture of the first material has been poured into the portions of the mold not covered by the inserts.
Figure 3:
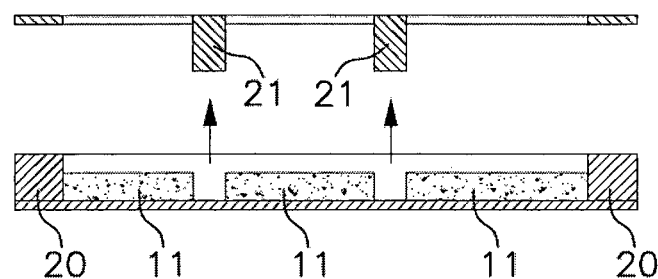
FIG. 3 shows a cross-section of the mold in a second step of the method of manufacturing a slab provided with thin and thick veins, in which the inserts of the mold are removed, hollow portions being left behind in the fluid mixture.

FIGS. 2 to 6 show the main steps of a method for manufacturing artificial stone slabs comprising thin and thick veins with a natural look according to an illustrative and non-limiting embodiment.

Said steps comprise first preparing a fluid mixture of a first material 11. Said mixture is prepared in a mixer in which a granular material, which will preferably be ground natural rock or mineral with a calibrated size, is introduced together with an organic or inorganic binder and additives, such as colorants or catalysts, stirring all of them together to obtain a homogeneous mixture.

In the present embodiment, the granular material will be white marble having granules of a size comprised between 0.5 mm and 2 mm, and the proposed binder will be an unsaturated polyester resin.

In a second step, a controlled amount of said fluid mixture of a first material 11 is poured into a 3070×1440 mm (alternatively 3300×1660) rectangular mold 20 that comprises the entire table, until filling it with a homogeneous thickness comprised between 6 to 10 cm, depending on the final thickness of the table, leaving an upper face of the fluid mixture exposed.

Said mold 20 has inserts 21 reproducing a pattern of thick veins having a variable thickness of between 15 mm and 150 mm, in this case said insert 21 is formed by closed curving bodies crossing said mold 20 reproducing in a precise manner a predefined pattern of thick vein having an apparently random geometry. Said inserts 21 are supported at the bottom of the mold 20 and are attached to two of the opposing sides of the mold 20 at the second intersection points 26.

The second intersection points 26 of the thick veins on one side of the mold 20 are symmetrical to the second intersection points 26 of the thick veins on the opposing side of the same mold 20, and they are also symmetrical along the same side of the mold 20.

Once the fluid mixture of the first material 11 is poured into the spaces of the mold 20 not covered by the insert 21, said insert 21 is removed from the mold 20, whereby the portions previously occupied by the insert will become empty. The viscosity and cohesion of the fluid mixture will be enough to prevent said fluid mixture of the first material 11 from flowing and occupying said empty portions.

The exposed upper face of the fluid mixture is then covered with a coating plate 24 provided with openings 23 coinciding with the pattern of thick veins left by the inserts 21 in said fluid mixture of the first material 11, and a fluid mixture of a third material 13 having a color different from that of the first material 11 is poured through said openings 23, completely filling said hollow portions of the mold 20.

In the present embodiment, the second material 12 will contain granite granules having a size comprised between 0.5 mm and 2 mm, and the proposed binder will be of a dark color (however any other color is possible, for instance of light colors) unsaturated polyester resin. Depending on the color of the first material the binder used for thick veins will have one color or another in order to contrast.

Said coating plate 24 is then removed and the exposed upper face of the fluid mixture is engraved with a predefined precise pattern of thin grooves 30 having a maximum thickness of 15 mm and a seemingly random curving layout. Said grooves 30 have a variable thickness and a tapering V-shaped section and define inner walls 31.

Figure 4:
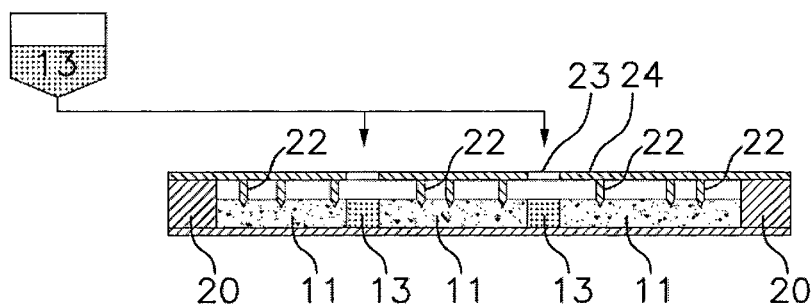
FIG. 4 shows a cross-section of the mold in a third step of the method of manufacturing a slab provided with thin and thick veins, in which the exposed upper face of the fluid mixture has been covered with a coating plate provided with openings coinciding with the hollow portions, through which a fluid mixture of a third material has been poured filling said hollow portions, said coating plate having an array of protrusions on its lower face that is inserted in said exposed upper face engraving it with grooves reproducing a pattern of thin veins to be reproduced.

In this example, engraving is obtained by means of inserting into the exposed upper face an-array-of-protrusions 22 reproducing the shape and position of the grooves 30 to be obtained. Said array of protrusions 22 is placed on a panel that is pressed against said exposed upper face, causing the engraving of said array of protrusions 22 in the fluid mixture. The mentioned panel with an array of protrusions 22 can be the same as the mentioned coating plate 24 provided with openings 23, such that two operations can be performed simultaneously, as shown in FIG. 4.

The subsequent removal of said array of protrusions 22 leaves said grooves 30 engraved on the mentioned exposed upper face.

Figure 5:
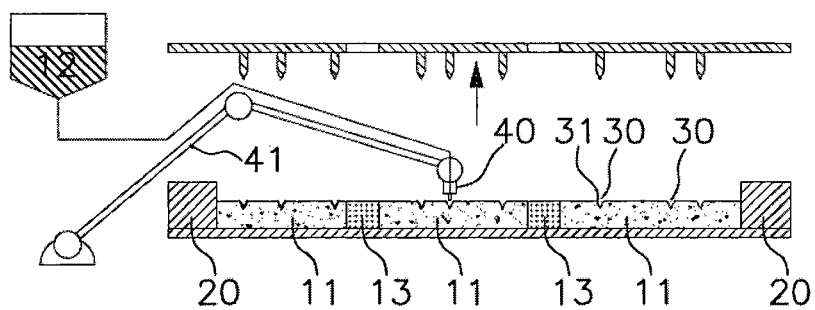
FIG. 5 shows a cross-section of the mold in a fourth step of the method of manufacturing a slab provided with thin and thick veins, in which said coating plate has been removed leaving said exposed upper face engraved with the mentioned grooves, and a robotic arm provided with a projecting head moves said head following the pattern of grooves, projecting a fluid mixture of a second material against the inner faces of said grooves.
Figure 6:
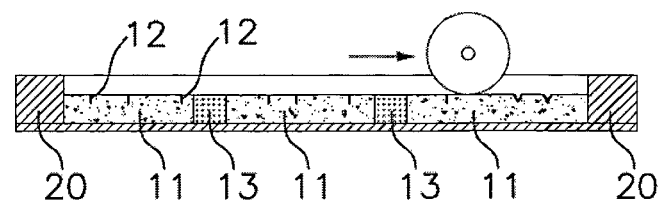
FIG. 6 shows a cross-section of the mold in a fifth step of the method of manufacturing a slab provided with thin and thick veins, in which the collapse and closure of said grooves has been caused by means of passing a roller over the exposed upper face.

A robotic arm 41 provided with a projecting head 40 then moves said projecting head 41 following the layout of said pattern of thin veins close to the grooves 30, while at the same time projecting a fluid mixture of a second material 12 through said projecting head 40 on the inner faces 31 of said grooves 30, as shown in FIG. 5.

In the present embodiment, the second material contains micronized granite granules having a size comprised between 0.1 μm and 0.75 mm, and the proposed binder will be a dark colored unsaturated polyester resin (light colors are also possible). The small size of the granules of the second material allows said fluid mixture of the second material 12 to be able to be projected.

The surface of the exposed upper face is then smoothed out by means of passing a roller over it, causing the collapse and closure of the grooves 30 such that they are reduced to a line of second material 12 reproducing the predefined pattern of thin veins.

Following this operation the artificial stone is subjected to vibration, compression and vacuum.

Finally, the slab is cured to harden it and it is then released from the mold. Preferably, the exposed upper face will be polished to assure that it is completely flat.

It has also been envisaged that said pattern of thin veins intersects the sides of the mold at the first intersection points 25, the mentioned first intersection points 25 of the thin veins being symmetrical on opposing sides of the mold 20 and within the same side.

This last feature as well as the aforementioned symmetry of the second intersection points 26 of the thick veins allows two slabs having identical first and second intersection points 25 and 26 to be able to be placed adjacent to one another, achieving that said thin and thick veins to have continuity from one slab to the next, making them look like parts of one and the same rock, regardless of the orientation or arrangement of said slabs.

The invention claimed is:

1. A method of manufacturing an artificial stone slab comprising veins, said method comprising the following steps performed in the following order:
    a) preparing a moldable hardenable fluid mixture of a first material which includes stone particles having a different grain size distribution;
    b) pouring a controlled amount of said mixture of the first material into a mold including a peripheral frame of the size of the artificial stone slab to be manufactured, an upper face of the mixture deposited in the mold being exposed;
    c) engraving the exposed upper face of the fluid mixture with a predefined precise pattern of open branched grooves, coinciding with a pattern of branched thin veins to be obtained, displacing the fluid mixture of the first material within the mold;
    d) partially filling the branched grooves, impregnating at least inner faces of said branched grooves with a moldable hardenable fluid mixture of a second material, by projecting said fluid mixture of a second material through at least one projecting head, moving said projecting head following said open grooves while said projection takes place, by at least an automated arm moving and reproducing said predefined precise pattern of grooves to be obtained, the color of the first material and of the second material being different;
    e) displace the fluid mixture of the first material causing the collapse of the first material onto the second material and the closure of the grooves, obtaining a visible pattern of thin veins of a second material with a natural look;
    f) curing the first and second material, producing an artificial stone slab, by subjecting said first and second materials to vibration, compression, and vacuum until the fluid mixtures of the first material and of the second material are hardened;
    g) releasing the artificial stone slab from the mold.

2. The method according to claim 1, wherein it further includes following steps which are additionally included:
    producing step b) inside a mold provided with inserts, leaving portions of said mold free of said fluid mixture of the first material, said inserts having a precise shape of a predefined pattern of thick veins to be obtained;
    removing said inserts, leaving empty spaces;
    filling said empty spaces corresponding to said portions of the mold free of the fluid mixture of the first material with a moldable hardenable fluid mixture of a third material having a different color from that of the first material, before proceeding with steps f) and g),
so that further obtaining a pattern of thick veins with a natural look on the artificial stone slab.

3. The method according to claim 2, wherein said filling of the portions of the mold free of the fluid mixture of the first material is performed by pouring said fluid mixture of a third material through openings made on a coating plate located on said exposed upper face covering it, said openings coinciding in shape, size and vertical position with said portions of the mold free of the fluid mixture of the first material.

4. The method according to claim 1, wherein step c) is performed by pressing an array of protrusions on the exposed upper face, said array of protrusions being complementary with the pattern of grooves to be engraved.

5. The method according to claim 3, wherein step c) is performed by pressing an array of protrusions on the exposed upper face, said array of protrusions being complementary with the pattern of grooves to be engraved, and wherein said array of protrusions is coupled onto a face of said coating plate.

6. The method according to claim 2, wherein said inserts are protected with an anti-adherent coating.

7. The method according claim 1, wherein at least a wheel, an awl, a plow and a comb are interchangeably connected or interchangeably connectable to the projecting head of the automated arm to be independently used, and the method including:
provide additional marks or recesses on any point of the exposed upper face of the mixture deposited in the mold; and
reaching by the movement of said automated arm the area of the grooves to partially remove or extend the second material delivered on step d).

8. The method according to claim 7, wherein said automated arm further includes at least one of:
a dispensing device for distributing small stones or crystals at specified regions of said upper face of the mixture deposited in the mold; and
a device for cleaning the interchangeable tools is used, based on the projection or immersion in a cleaning fluid.

9. The method according to claim 2, wherein said an automated arm further includes connected to said projecting head several interchangeable tools including at least a wheel, an awl, a plow and a comb in order to provide additional marks or recesses on any point of the exposed upper face of the mixture deposited in the mold said tools also being prepared for reaching by the movement of said automated arm the area of the grooves to remove or extend in some degree the projected fluid mixture delivered on step d), and wherein said automated arm with said projecting head and interchangeable tools is further used to finishing tasks on the periphery of the thick veins.

10. The method according to claim 1, wherein said grooves, coinciding with a pattern of thin veins, have a depth which is comprised between $3/10$ to $4/10$ of the total thickness of the artificial stone slab.

11. The method according to claim 2, wherein said empty spaces defining said thick veins have a depth which embraces the total thickness of the artificial stone slab.

12. The method according to claim 1, wherein said grooves once are engraved, before step d), providing an open cavity with triangular cross section and two inclined opposed faces, and during said step d) at least one of these faces receives the projected fluid mixture of a second material, or alternatively both faces of the groove are covered with the same or different fluid mixture.

13. The method according to claim 1, wherein step e) is performed by one or more of the following techniques:
leveling the exposed upper face by a roller;
leveling the exposed upper face by a spatula;
leveling by vibration-compression; and/or
pressing on the slab.

14. The method according to claim 1, wherein the moldable hardenable fluid mixture of a first and/or second material (11, 12) contains at least one material selected from the following:
polymerizable resin;
ground solid particles with a grain size distribution comprised between 1.21 and 15 mm;
ground solid particles with a grain size distribution comprised between 0.76 and 1.20 mm;
micronized solid particles with a grain size distribution comprised between 0.1 μm and 0.75 mm;
additives;
polymerizable resin selected from unsaturated polyester resin, methacrylate resin, epoxy resin, vinyl resin;
ground solid particles having a different grain size distribution selected from stone material, marble, dolomite, opaque quartz, crystalline quartz, graphite, ferrosilicon, basalt, feldspar, granite, cristobalite, glass, silica, metals, plastics;
additives selected from colorants, binders, accelerants, catalysts.

15. The method according to claim 2, wherein the slab is rectangular provided with four sides, in which:
the thin veins intersect said sides at first intersection points, and said first intersection points of two opposing sides of the same slab are symmetrical; and/or
the thick veins intersect said sides at second intersection points, and said second intersection points of two opposing sides of the same slab are symmetrical; and/or
the first intersection points of one and the same side are symmetrical along said same side; and/or
the second intersection points of one and the same side are symmetrical along said same side.

16. The method according to claim 15, wherein the length of the slab is a multiple dimension of the width of said slab.

17. The method according to claim 1, including at least one of:
the pattern of thin veins is branched; and
said thin veins have a thickness less than 15 mm.

18. The method according to any one of the preceding claims, wherein after step f) the exposed upper face of the slab manufactured is polished.

19. The method according to claim 2, including at least one of:
the pattern of thick veins is branched; and
the thick veins have a thickness more than 15 mm.

20. The method according to claim 2, wherein the moldable hardenable fluid mixture of a third material contains at least one material selected from the following:
polymerizable resin;
ground solid particles with a grain size distribution comprised between 1.21 and 15 mm;
ground solid particles with a grain size distribution comprised between 0.76 and 1.20 mm;
micronized solid particles with a grain size distribution comprised between 0.1 μm and 0.75 mm; additives;
polymerizable resin selected from unsaturated polyester resin, methacrylate resin, epoxy resin, vinyl resin;
ground solid particles having a different grain size distribution selected from stone material, marble, dolomite, opaque quartz, crystalline quartz, graphite, ferrosilicon, basalt, feldspar, granite, cristobalite, glass, silica, metals, plastics;
additives selected from colorants, binders, accelerants, catalysts.

* * * * *